United States Patent [19]

Tran et al.

[11] Patent Number: 5,119,673
[45] Date of Patent: Jun. 9, 1992

[54] APPARATUS FOR DETERMINING CROSSWIND EFFECTS ON VEHICLES

[75] Inventors: Van T. Tran, Stuttgart; Jens Desens, Esslingen; Rainer Tiefenbacher, Leinfelden-Echterdingen; Karl-Heinz Blume, Gäufelden, all of Fed. Rep. of Germany

[73] Assignee: Daimler-Benz AG, Fed. Rep. of Germany

[21] Appl. No.: 553,651

[22] Filed: Jul. 18, 1990

[30] Foreign Application Priority Data

Jul. 19, 1989 [DE] Fed. Rep. of Germany ....... 3923854

[51] Int. Cl.⁵ .............................................. B60R 27/00
[52] U.S. Cl. ................................... 73/182; 73/861.66; 364/424.05; 180/903
[58] Field of Search ................... 73/37, 178, 180, 182, 73/861.65, 861.60; 180/903, 282; 364/432, 424.05

[56] References Cited

U.S. PATENT DOCUMENTS

| | | | |
|---|---|---|---|
| 3,149,491 | 9/1964 | Sissenwine et al. | 73/182 |
| 4,810,022 | 3/1989 | Takagi et al. | 364/424.05 |
| 4,987,542 | 1/1991 | Tran | 73/182 X |

FOREIGN PATENT DOCUMENTS 3816057 4/1989 Fed. Rep. of Germany.

*Primary Examiner*—Hezron E. Williams
*Assistant Examiner*—Michael J. Brock
*Attorney, Agent, or Firm*—Evenson, Wands, Edwards, Lenahan & McKeown

[57] ABSTRACT

An apparatus for determining crosswind effects on motor vehicles has arranged on the vehicle two differential pressure sensors which are each connected via two conduits to two openings at the outside of the vehicle and record the pressure difference which occurs between the connected conduits or the associated openings. From this, it is possible for the angle of incidence and the dynamic pressure of the crosswind to be determined by a computer.

9 Claims, 2 Drawing Sheets

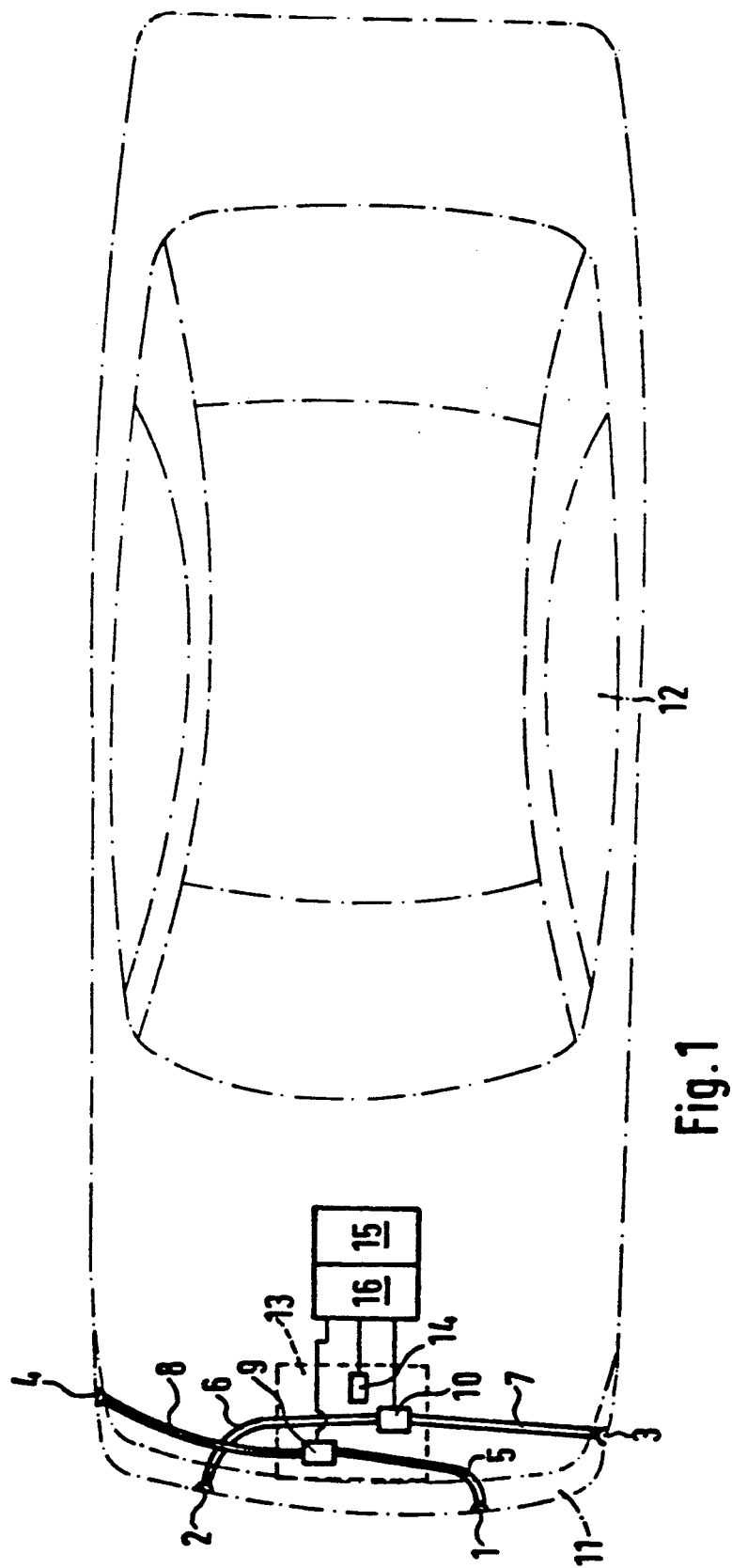

APPARATUS FOR DETERMINING CROSSWIND EFFECTS ON VEHICLES

BACKGROUND AND SUMMARY OF THE INVENTION

The present invention relates to an apparatus for determining crosswind effects on vehicles, in particular motor vehicles, having a measuring and computing device which evaluates pressure differences occurring in the case of a crosswind between measuring points on opposite sides of the vehicle, in particular in the region of the front corners of the vehicle. A signal representing the direction of the wind relative to the vehicle is formed by the quotient of a first pressure difference between a first measuring point on one side of the vehicle and a second measuring point, asymmetric thereto, on the other side of the vehicle and of a second pressure difference between a third measuring point on one side of the vehicle and a fourth measuring point, asymmetric thereto, on the other side of the vehicle. A signal representing the dynamic pressure of the crosswind is determined from the multiplication of the pressure difference between two measuring points situated asymmetrically to one another on opposite sides of the vehicle with a predeterminable factor which is dependent on the signal representing the direction of the wind.

Such an apparatus is described in German Patent No. 38 16 057. In the determination of the direction of the wind in this known patent, use is made of the fact that, in the case of a crosswind, flow around a vehicle formed symmetrically to the vertical longitudinal center plane in the customary fashion is asymmetric to the vertical longitudinal center plane. According to this earlier patent application, the degree of asymmetry and hence the angle of incidence of the crosswind relative to the vehicle can be determined by evaluating the pressure at a small number of measuring points at the outside of the vehicle. To determine the dynamic pressure, it is then sufficient to determine a pressure difference at two measuring points positioned on both sides of the vehicle, it being necessary in addition for this pressure difference to be multiplied by a correction factor correlated with the angle of incidence.

According to the earlier patent application, differential pressure gauges are preferably arranged at the outside, at the respective measuring points. These pressure gauges measure the pressure difference between their outward-facing side and their inside, which is connected via tube or hose lines to a reference chamber common to all the differential pressure gauges. The reference chamber is designed and arranged in such a way that any pressure fluctuations which occur in this chamber take place considerably more slowly than pressure changes occurring at the outside of the differential pressure gauges and hence outside the vehicle, in particular those which are caused by crosswind.

Account is taken of the fact that differential pressure gauges operate relatively precisely (even inexpensive gauges), and knowledge of the absolute pressure values at the respective measuring points is not necessary for the determination of the angle of incidence or the dynamic pressure of the crosswind.

According to German Patent 38 16 057, the measuring points or the differential pressure gauges are arranged in particular in the region of the front corners of the vehicle because particularly large crosswind-dependent pressure differences occur there.

Provision is furthermore made according to this known patent for the differential pressure gauges to be fitted near the outward-leading mouths of the tube or hose lines connected to the common reference chamber in order to guarantee that the differential pressure gauges can react virtually without delay to pressure changes of the air at the outside of the vehicle.

An object of the present invention is to further simplify an apparatus for determining the crosswind effect on motor vehicles.

This and other objects are achieved according to embodiments of the present invention by the fact that to determine the pressure differences at least two differential pressure sensors are connected between in each case two conduits (e.g. tubes or hoses) of the same type which, with their open ends remote from the respective differential pressure sensor, open to the outside at mutually asymmetric points on both sides of the longitudinal axis of the vehicle, and that the open ends of the conduits are arranged at openings of a bumper which also accommodates the conduits and the associated differential pressure sensors.

In the present invention, use is made of the surprising fact that the pressure differences at the mouths of the conduits associated with a differential pressure sensor can be determined virtually instantaneously by means of the differential pressure sensor because pressure changes at the mouths propagate towards the differential pressure sensor at extraordinarily high speed in the conduits. Even at an inside diameter of the conduits of 1 mm, it is possible (at least if, as in normal vehicles, the length of the conduits is of the order of about 1 m) to count on a propagation speed of the pressure changes in the conduits in the range of the speed of sound in air. The invention thus makes it possible to determine the pressure difference at two measuring points at a distance from one another with in each case only one differential pressure sensor, with the result that the number of pressure sensors remains small even for a relatively large number of measuring points. Accordingly, the performance requirements of the computer used for evaluation of the sensor signals also remain relatively low.

By arranging the conduits and the associated sensors at the bumpers of the vehicle, it is possible to retrofit a motor vehicle with an apparatus for determining crosswind effects without the need to carry out significant work on the vehicle body. Moreover, the bumpers of all motor vehicles offer sufficient space to accommodate the apparatus according to the invention, and this with a minimum expenditure in terms of construction.

It can furthermore be expedient to accommodate the differential pressure sensors together with a thermocouple in a box or housing or in a hollow at the bumper, such that all differential pressure sensors are exposed to approximately the same temperature. In this way, there is the possibility of taking into account the respective temperature with the thermocouple and compensating any temperature drift of the differential pressure sensors.

Other objects, advantages and novel features of the present invention will become apparent from the following detailed description of the invention when considered in conjunction with the accompanying drawings.

BRIEF DESCRIPTION OF THE DRAWINGS

FIG. 1 shows a schematic plan view of a motor vehicle having an apparatus according to an embodiment of the present invention for determining crosswind effects.

DETAILED DESCRIPTION OF THE DRAWINGS

Figure 4:
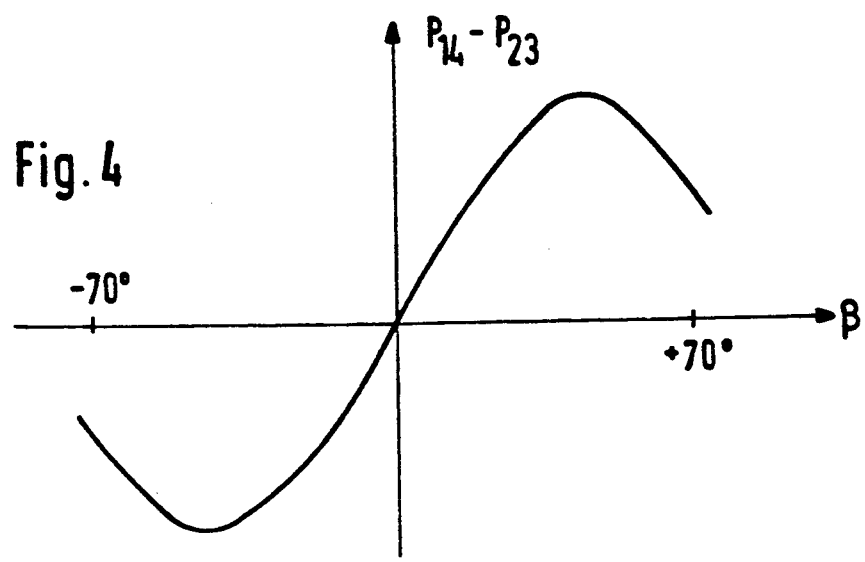
FIG. 4 is a diagram which shows the difference of the coefficients $c_{23}$ and $c_{14}$ as a function of the angle of incidence $\beta$.

In the embodiment of the present invention illustrated in FIG. 1, four openings 1-4, to which are connected hose or tube lines 5-8, are arranged at the front bumper 11 of a motor vehicle 12 symmetrically to the vertical longitudinal center plane of the vehicle. The hose or tube lines 5-8 are connected in pairs to differential pressure sensors 9 and 10. Differential pressure sensor 9 records the differential pressure between hose or tube lines 5 and 8 and differential pressure sensor 10 records the pressure difference between hose or tube lines 6 and 7.

The hose or tube lines 5-8 have an inside diameter of about 1.5 mm, as have the openings 1-4, with the result that pressure changes at the openings 1-4 propagate at approximately the speed of sound to the respectively associated differential pressure sensors 9 and 10.

If it is assumed that the hose or tube lines 5-8 are each about 70 cm long, the propagation of a pressure change from one of the openings 1-4 to one of the differential pressure sensors 9 and 10 takes place within about 20 ms.

In an embodiment of the invention, the differential pressure sensors 9 and 10 are accommodated within a housing or box 13 at the bumper 11. The housing or box 13 is arranged or designed in such a way that both differential pressure sensors 9 and 10 are exposed to approximately the same temperature. This temperature can be recorded via a thermocouple 14 arranged in the housing or box 13. Alternatively, the bumper 11 contains a hollow that accommodates the differential pressure sensors 9 and 10.

The signals of the differential pressure sensors 9 and 10 and of the thermocouple 14 are fed via appropriate signal lines to a computing unit 15 which evaluates these signals to determine the effects of crosswind. Here, the signals of the thermocouple 14 are used to compensate by calculation any temperature drift of the differential pressure sensors 9 and 10. A separate circuit module 16 can also be used for this purpose if required, this circuit module compensating the influence of the ambient temperature on the differential pressure sensors 9 and 10 as a function of the signals of the thermocouple 14. This has the result that the computing unit 15 only receives signals which represents the pressure differences at the differential pressure sensors 9 and 10 in a manner largely free from temperature effects. Conventional computing devices can be used as the computing device 15.

Using the arrangement shown in FIG. 1, it is possible to determine the effects of those crosswinds which have a component acting in the opposite direction to the driving direction of the vehicle during forward travel and form an angle of between $+70°$ and $-70°$ to the longitudinal axis of the vehicle. This is explained below with FIGS. 2-4.

Differential pressure sensor 9 measures the pressure difference $p_{14}$ between the pressures at the openings 1 and 4, and differential pressure sensor 10 measures the pressure difference $p_{23}$ between the openings 2 and 3. First of all, the difference $(p_{14} - p_{23})$ is calculated. If the vehicle body 12 is sufficiently symmetrical with respect to its vertical longitudinal center plane, this difference has the value zero when the direction of the wind coincides with the longitudinal axis of the vehicle 12. If the wind (as seen in FIG. 1) is coming obliquely from the right and from the front of the vehicle 12, i.e. if the angle of incidence $\beta$ has positive values, then the pressure difference has positive values. For negative values of the angle of incidence $\beta$, i.e. when the wind is acting from the front and obliquely from the left on the vehicle, the difference becomes negative. A typical variation of the difference $(p_{14} - p_{23})$ as a function of the angle of incidence $\beta$ is represented in FIG. 4.

When the difference $p_{14} - p_{23}$ is positive, i.e. when the wind is from the right, a difference quotient $D_{2314} = p_{23}/p_{14}$ is determined. If this difference is negative, i.e. when the wind is incident on the vehicle from the left, the difference quotient $D_{1423} = p_{14}/p_{23}$.

Figure 2:
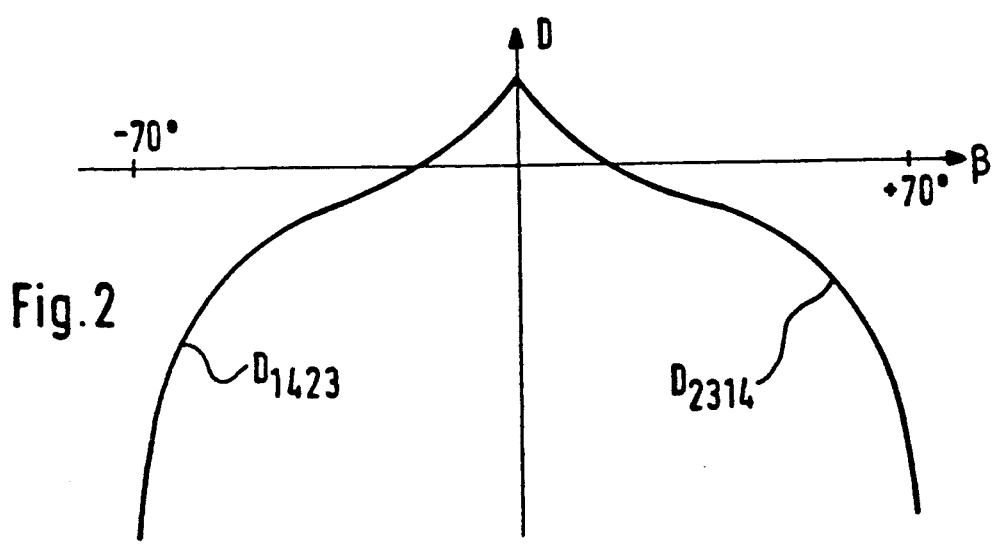
FIG. 2 shows a diagram which represents the angle of incidence $\beta$ of the crosswind relative to the vehicle as a function of a difference quotient $D_{1423}$ or $D_{2314}$, which can be determined from the signals of the differential pressure sensors.

The values of these difference quotients change with the size of the angle of incidence $\beta$, as demonstrated by way of example in FIG. 2. The variation of the curves representing the difference quotients $D_{1423}$ and $D_{2314}$ will depend on the shape of the particular vehicle.

The respective angles of incidence $\beta$ are allocated in a memory of the computing unit 15 to the possible values of the difference quotients $D_{1423}$ and $D_{2314}$ in accordance with the shape of the body of the particular vehicle. The computing unit 15 is then able to determine the angle of incidence $\beta$ for that vehicle by calculation of the difference quotients.

Figure 3:
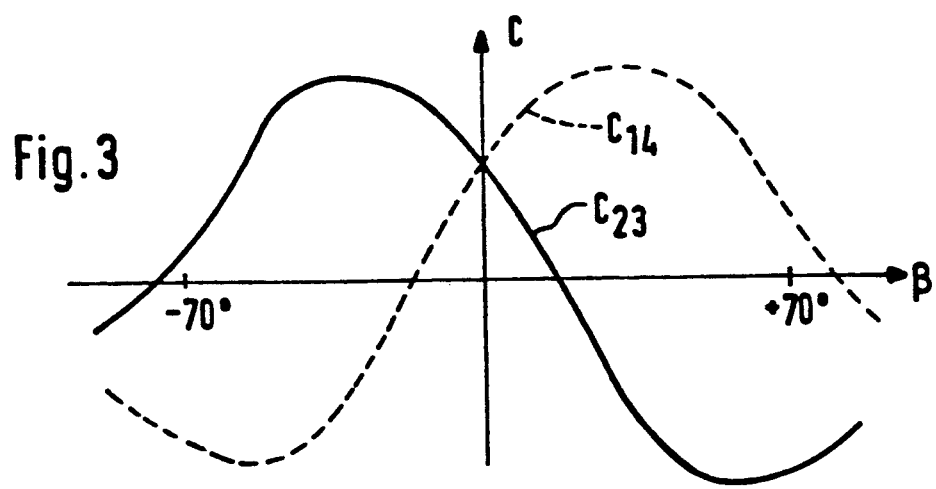
FIG. 3 shows a diagram which represents, as a function of the angle of incidence $\beta$, coefficients $c_{23}$ and $c_{14}$ used for calculating the dynamic pressure.

It is now possible for the dynamic pressure exerted on the vehicle by the wind to be calculated also. For this purpose, the value of the pressure difference $p_{14}$ or $p_{23}$ allocated to the previously determined value of the angle of incidence $\beta$ is divided by a coefficient $c_{14}$ or $c_{23}$, the magnitude of which depends solely on the value of the angle of incidence $\beta$ in the particular case (and on the shape of the particular vehicle body). FIG. 3 shows a typical variation of the coefficients $c_{14}$ and $c_{23}$ as a function of the angle of incidence $\beta$. The values of $c_{14}$ and $c_{23}$ for a particular vehicle are easily determinable by one of ordinary skill in the art.

On the basis of the determined dynamic pressure, the computing unit 15 can determine calculation steering maneuvers by which the effect of crosswind can be largely compensated. By corresponding control of actuating members of an automatic steering system of the vehicle, e.g. an automatic rear-wheel steering system, the effect of crosswind can then be compensated, at least to the extent that control of the vehicle is made considerably easier for the driver even in the case of very strong crosswinds and high driving speeds.

Since there is a marked dependence of the pressure differences recorded by the differential pressure sensors 10 and 9 on the angle of incidence $\beta$ of the crosswind, in an embodiment of the invention the openings 1 and 2 are open towards the front in the longitudinal direction of the vehicle (as seen in FIG. 1) while the openings 3 and 4 are directed towards the sides of the vehicle but are arranged near the front side front corners of the vehicle.

An embodiment of the invention provides that the openings 1 and 3 and 2 and 4 are arranged symmetrically to the vertical longitudinal center plane of the vehicle because then the difference $p_{14}-p_{23}$ has the value zero for flow against or around the vehicle symmetrical to this plane. It is also contemplated, in other embodiments, to arrange the openings asymmetrically. It is merely necessary to take into account that the pressure difference has the value zero for a particular direction of the wind oriented obliquely to the longitudinal axis of the vehicle while a value deviating from zero is obtained for the difference when the longitudinal axis of the vehicle and the direction of the wind coincide. This does not alter the principle of operations of the apparatus.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An apparatus for determining crosswind effects on motor vehicles comprising:
   a measuring and computing device which evaluates pressure differences occurring in a crosswind between measuring points on opposite sides of the vehicle, including:
   means for forming a direction signal representing the direction of the crosswind relative to the vehicle from the quotient of a first pressure difference between a first measuring point on one side of the vehicle and a second measuring point on another side of the vehicle asymmetric to the first measuring point and a second pressure difference between a third measuring point on one side of the vehicle and a fourth measuring point on another side of the vehicle asymmetric to the third measuring point; and
   means for forming a dynamic pressure signal representing the dynamic pressure of the crosswind, said dynamic pressure signal being formed by multiplicatively combining a pressure difference between two measuring points situated asymmetrically to one another on opposite sides of the vehicle with a predeterminable factor that is dependent on the direction signal;
   means for measuring the pressure difference between two measuring points, said means for measuring including: at least two differential pressure sensors; separate pairs of conduits that are each coupled to one of the differential pressure sensors, each conduit having an opening remote from the differential pressure sensor to which it is coupled, and opening to the atmosphere at mutually asymmetric points on both sides of a longitudinal axis of the vehicle; and
   a bumper at which said openings are arranged, said bumper accommodating the conduits and the differential pressure sensors.

2. The apparatus according to claim 1, further comprising a thermocouple coupled to the measuring and computing device, and wherein the bumper contains a housing for housing the differential pressure sensors and the thermocouple such that the differential pressure sensors are exposed to approximately the same temperature and have approximately the same temperature drift.

3. The apparatus of claim 2, wherein the inside diameter of the conduits and of the openings is greater than 1 mm.

4. The apparatus of claim 3, wherein the inside diameter of the conduits and of the openings is 1.5 mm.

5. The apparatus of claim 3, wherein the conduits are formed by hollows in the bumper, each of said hollows opening to the outside through said openings.

6. The apparatus of claim 1, wherein the inside diameter of the conduits and of the openings is greater than 1 mm.

7. The apparatus of claim 6, wherein the inside diameter of the conduits and of the openings is 1.5 mm.

8. The apparatus of claim 1, wherein the conduits are formed by hollows in the bumper, each of said hollows opening to the outside through said openings.

9. The apparatus according to claim 1, further comprising a thermocouple coupled to the measuring and computing device, and wherein the bumper contains a hollow for housing the differential pressure sensors and the thermocouple such that the differential pressure sensors are exposed to approximately the same temperature and have approximately the same temperature drift.

* * * * *